(12) United States Patent
Nakamura

(10) Patent No.: US 6,231,197 B1
(45) Date of Patent: May 15, 2001

(54) HELIOSTAT FOR SUNLIGHT COLLECTING SYSTEM

(75) Inventor: Katsushige Nakamura, Hachioji (JP)

(73) Assignee: Mitaka Kohkico., Ltd. (JP)

( * ) Notice: Subject to any disclaimer, the term of this patent is extended or adjusted under 35 U.S.C. 154(b) by 0 days.

(21) Appl. No.: 09/531,598

(22) Filed: Mar. 20, 2000

(51) Int. Cl.[7] ................................................. G02B 5/10
(52) U.S. Cl. ..................... 359/853; 359/850; 359/851; 126/569; 126/571; 126/572
(58) Field of Search .................................. 359/853, 850, 359/851, 852, 871, 872, 874; 126/569, 571, 572, 573, 574, 575, 576, 577, 578, 600–608, 680

(56) References Cited

U.S. PATENT DOCUMENTS 5,979,438 * 11/1999 Nakamura ..................... 126/680

FOREIGN PATENT DOCUMENTS

| 52-10931 | 7/1975 | (JP). |
|---|---|---|
| 56-102645 | 8/1981 | (JP). |
| 56-102646 | 8/1981 | (JP). |
| 57-63504 | 4/1982 | (JP). |
| 57-120809 | 7/1982 | (JP). |
| 59-74460 | 4/1984 | (JP). |

\* cited by examiner

Primary Examiner—Mohammad Sikder
(74) Attorney, Agent, or Firm—Gilberto M. Villacorta; Matthew P. McWilliams; Pepper Hamilton LLP

(57) ABSTRACT

An azimuth sensor unit 15 and an altitude sensor unit 16 have pairs of optical sensors 18 and 20, respectively, disposed along their respective directions, which pair of optical sensors are disposed toward the sun in the form of a tapered section narrower to the front end and broader to the rear end with their light-receiving surfaces outward, and the azimuth sensor unit and the altitude sensor unit themselves rotate so as to balance light-receiving amounts of their respective pairs of optical sensors and send signals for rotating a concave mirror 10 in the same directions by half the amounts of the rotations of the azimuth sensor unit and the altitude sensor unit to a drive mechanism.

4 Claims, 3 Drawing Sheets

HELIOSTAT FOR SUNLIGHT COLLECTING SYSTEM

BACKGROUND OF THE INVENTION

1. Field of the Invention

This invention relates to a heliostat used for a sunlight collecting system that utilizes sunlight as energy.

2. Prior Art

For the global environment, the $CO_2$ problem is so serious that the present social system relying heavily on petroleum energy is a great concern for every country. In this context, as clean energy not affecting the environment, solar energy has attracted much attention. Particularly in countries in desert areas, projects for collecting solar energy to obtain huge energy have proceeded.

Those projects, however, have not gotten good results in performance and costs. The reason is that in order to utilize sunlight as energy, it is required to concentrate sunlight into a point to convert it into thermal energy and then to convert the thermal energy into electricity, in which there is difficulty in controlling heliostats for concentrating the sunlight into the point. The heliostats are arranged in large numbers around a light-collecting point for collecting the sunlight, and their individual concave mirrors are each rotated in both azimuth and altitude directions to reflect and converge the sunlight into the point. Since the above projects have attempted controlling the concave mirror of each heliostat by computer, the controlling is complex and difficult. More specifically, the movement of the sun changes in both azimuth and altitude with time, which fact causes difficulty in controlling the concave mirrors of the heliostats in large numbers simultaneously, pursuing the movement of the sun. Moreover, since the concave mirror of the heliostat has a diameter as large as ten-odd meters, the concave mirror can deform largely in such an area as a desert where the difference in temperature between day and night is large. As a result, the precision of information on a position sent from the concave mirror to the computer is likely to be lowered, which fact also causes difficulty in computer controlling.

The present invention directs its attention to the above prior art technique and provides a heliostat for a sunlight collecting system, a convex mirror of which can be controlled without computer.

SUMMARY OF THE INVENTION

The present invention relates to a heliostat for a sunlight collecting system comprising a concave mirror rotating in both an azimuth direction and an altitude direction to constantly reflect and converge sunlight into a fixed light-collecting point, a driving mechanism for rotating the concave mirror in the azimuth direction and the altitude direction and an azimuth sensor unit and an altitude sensor unit each outputting signals related to the amounts of rotations in the azimuth direction and the altitude direction, respectively, to the driving mechanism wherein, each of the azimuth sensor unit and the altitude sensor unit has a pair of optical sensors disposed along its direction, which pair of optical sensors being disposed toward the sun in the form of a tapered section narrower to the front end and broader to the rear end with their light-receiving surfaces outward, and the azimuth sensor unit and the altitude sensor unit themselves rotate so as to balance the light-receiving amounts of their respective pairs of optical sensors and output signals for rotating the concave mirror in the same directions by half the amounts of the rotations of the azimuth sensor unit and the altitude sensor unit to the drive mechanism.

According to the present invention, each of the azimuth sensor unit and the altitude sensor unit has the pair of optical sensors disposed toward the sun in the form of the tapered section narrower to the front end and broader to the rear end, thereby having a broader sunlight receiving angle and easily detecting the difference in the light-receiving amounts of the pair of optical sensors. The azimuth sensor unit and the altitude sensor unit each constantly rotate so as to face to the direction of the sun, so that the amounts of their rotations agree with the amount of rotation of the sun in diurnal motion. Since the concave mirror reflecting sunlight rotates by half the amounts of the rotations of the azimuth sensor unit and the altitude sensor unit (the amount of the rotation of the sun in diurnal motion) in the same directions, reflected sunlight is constantly directed to the same point. Accordingly, the concave mirror can reflect and converge sunlight constantly into a fixed light-collecting point. Thus, balancing the light-receiving amounts of the pair of optical sensors provides the controlling of the concave mirrors, which is simpler than the computer controlling, causing few errors.

A preferable angle of each optical sensor with respect to the direction of sunlight radiation is 5 to 10 degrees.

It should be noted that the present invention is not limited to the above explanation. The objects, advantages, features and uses of the present invention will be more apparent from the following detailed description in reference to the accompanying drawings. It should be understood that suitable modifications not departing from the spirit of the invention all reside in the scope of the present invention.

PREFERRED EMBODIMENT

Figure 1:
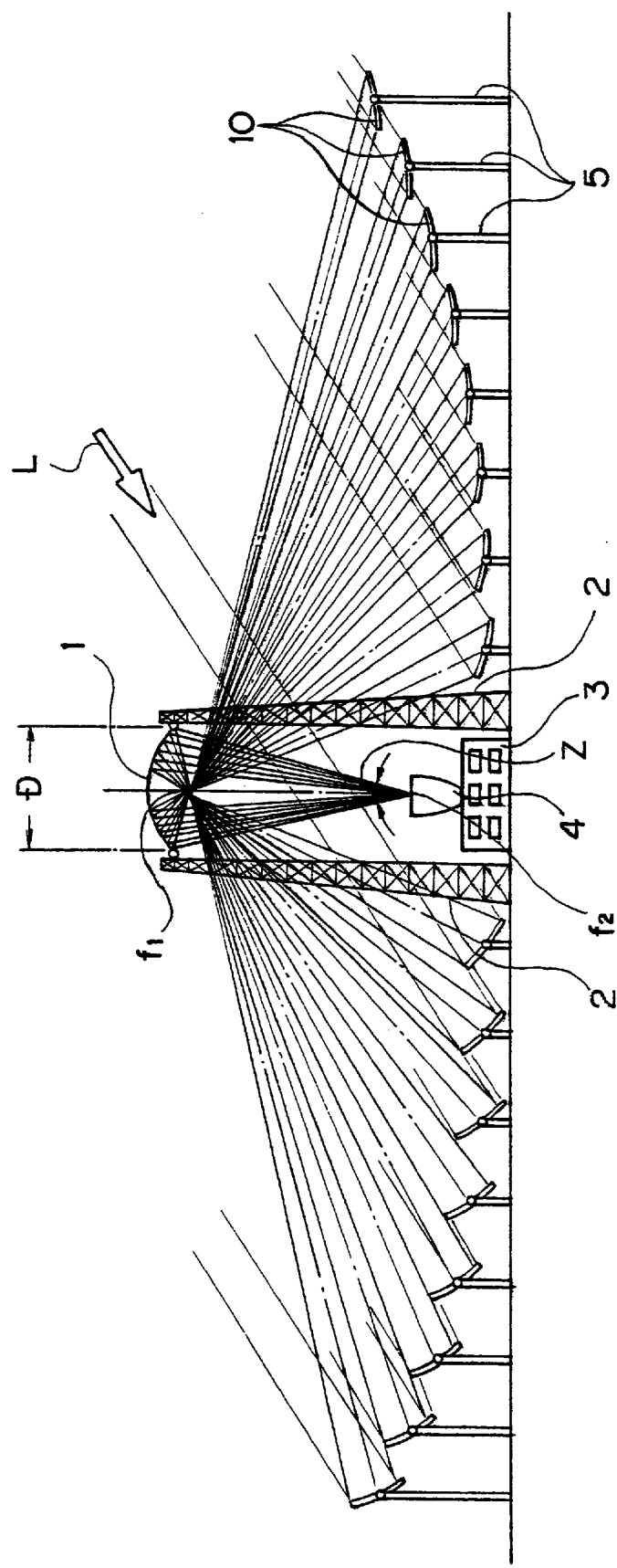
FIG. 1 is an entire cross-sectional view of a sunlight collecting system in accordance with an embodiment of the present invention.
Figure 2:
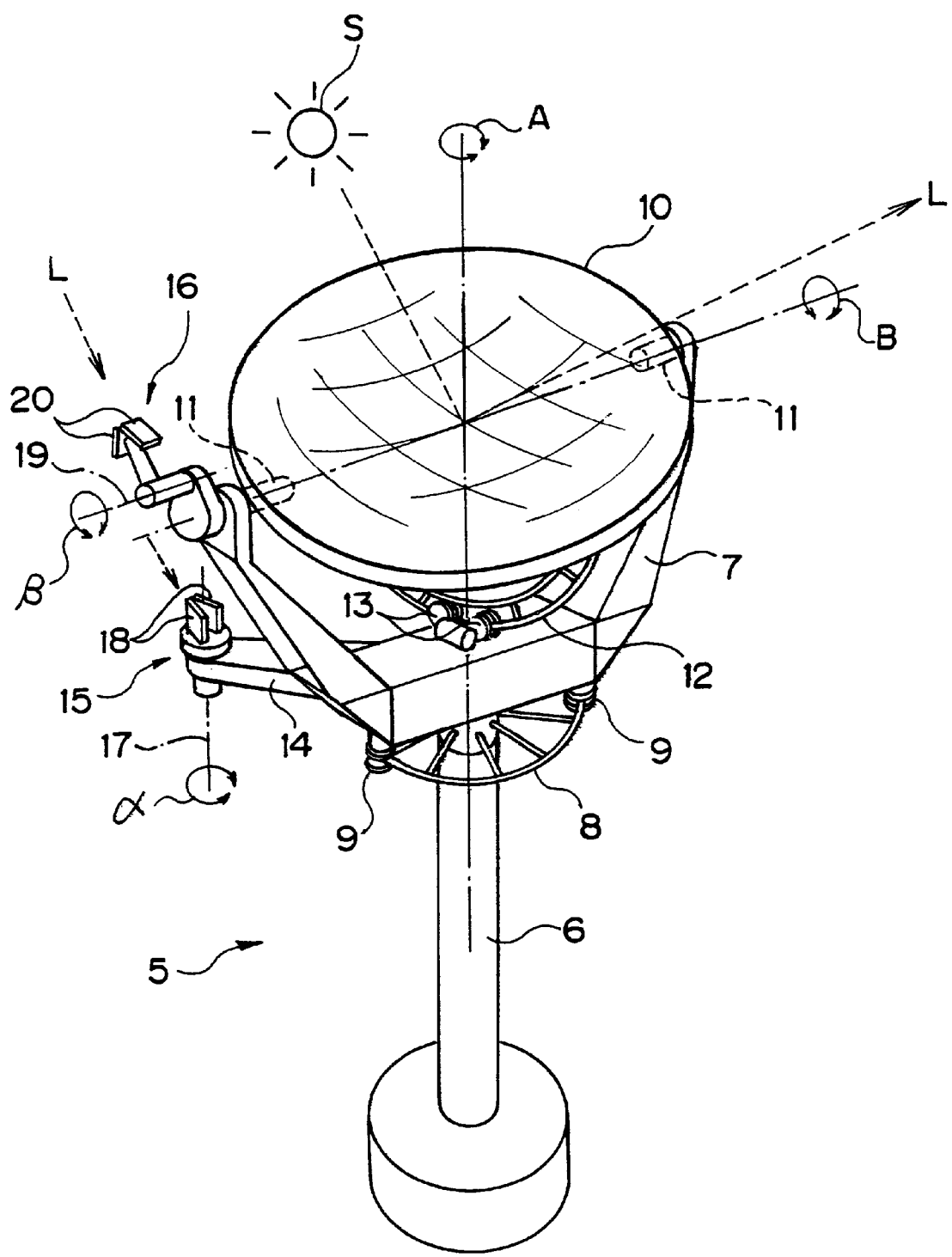
FIG. 2 is a perspective view of a heliostat.

A preferred embodiment of the present invention will be described in reference to FIGS. 1 to 4. An oval mirror 1 is installed downwardly at a predetermined height with supporting towers 2. For the oval mirror 1, there exist a first focal point f1 and a second focal point f2 as "light-collecting points" below the oval mirror 1. A heat-exchange facility 3 for converting sunlight L into thermal energy is built below the oval mirror 1. On the top of the heat-exchange facility 3, a cylindrical condenser mirror 4 is mounted. A plurality of heliostats 5 are provided on the ground around the heat-exchange facility 3, surrounding the oval mirror 1.

On the top of a column 6 of the heliostat 5, a fork 7 rotatable in an azimuth direction A (See FIG. 2) is mounted. An annular link 8 is provided about the column 6. On an opposite position across the column 6 of the fork 7, a pair of upper and lower rotary pulleys 9 are provided in the downward direction. Between the pair of upper and lower rotary pulleys 9, the annular link 8 is sandwiched. Accordingly, when the rotary pulleys 9 are rotated, the fork 7 is rotated in the azimuth direction A. The annular link 8 and the rotary pulleys 9 constitute a "drive mechanism" in the azimuth direction in this embodiment.

On the upper ends of the fork 7, a concave mirror 10 rotatable in an altitude direction B (See FIG. 2) is mounted. The concave mirror 10 has a circular (or quadrilateral) shape, curvature of which is spherical (or parabolic). Rotary axes 11 fixed in opposite positions of the concave mirror 10 rotatably support the upper ends of the fork 7, whereby the concave mirror 10 is rotatable in the altitude direction B.

Further, on the rear side of the concave mirror 10, both ends of an arcuate link 12 are fixed in the opposite positions at an angle of 90 degrees with respect to the rotary axes 11. On the bottom surface of the center of the fork 7, two pairs of rotary pulleys 13 are provided. Between each pair of rotary pulleys 13, the arcuate link 12 is sandwiched. When the rotary pulleys 13 are rotated, the concave mirror 10 is rotated on the rotary axes 11 in the altitude direction B. The arcuate link 12 and the rotary pulleys 13 constitute a "drive mechanism" in the altitude direction in this embodiment.

The concave mirror 10 of the heliostat 5 having the above structure is set higher as distanced farther from the oval mirror 1 in order to reduce shading loss due to interference among the concave mirrors 10.

On the column 6 of the heliostat 5, an azimuth sensor unit 15 is mounted via an arm 14. On one upper end of the fork 7, an altitude sensor unit 16 is mounted. The azimuth sensor unit 15 is rotatable on a perpendicular axis 17 in an α direction, having a pair of optical sensors 18 disposed toward the sun S in the form of a tapered section narrower to the front end and broader to the rear end in a horizontal direction (in the azimuth direction), rotating to a direction in which the light-receiving amounts of the pair of optical sensors are balanced as well as detecting the amount of the rotation. The altitude sensor unit 16 is rotatable on a horizontal axis 19 in aβ direction, having a pair of optical sensors 20 disposed toward the sun S in the form of the tapered section narrower to the front end and broader to the rear end in a perpendicular direction (in the altitude direction), rotating to a direction in which the light-receiving amounts of the pair of optical sensors are balanced as well as detecting the amount of the rotation. In the azimuth sensor unit 15 and the altitude sensor unit 16, the pairs of optical sensors 18 and 20 are each in the form of the tapered section with their light-receiving surfaces outward.

The function of the azimuth sensor unit 15 and the altitude sensor unit 16 will be described below. Since the azimuth sensor unit 15 and the altitude sensor unit 16 have the same function, the description will be made only on the azimuth sensor unit 15 shown in FIGS. 3 and 4. The optical sensors 18 can be shifted by the same angle θ within the range of 5 to 10 degrees with respect to a radiation direction X of the sun S. The optical sensors 18 disposed in the form of the tapered section have a larger light-receiving angle R and are capable of receiving sunlight on the part except the part at a dead angle D sandwiched between extensions of the optical sensors 18 on the opposite side of the sun. Within the light-receiving angle R, a central angle R1 sandwiched between extensions of the opposite optical sensors 18 corresponds to the front sun S, at which the both optical sensors 18 are in a light-receiving state. In the right optical sensor 18, a right angle R2 from the central angle R1 to the dead angle D corresponds to the sun S on the right, at which only the right optical sensor 18 is in the light-receiving state. In the left optical sensor 18, a left angle R3 from the central angle R1 to the dead angle D corresponds to the sun S on the left, at which only the left optical sensor 18 is in the light-receiving state.

Figure 3:
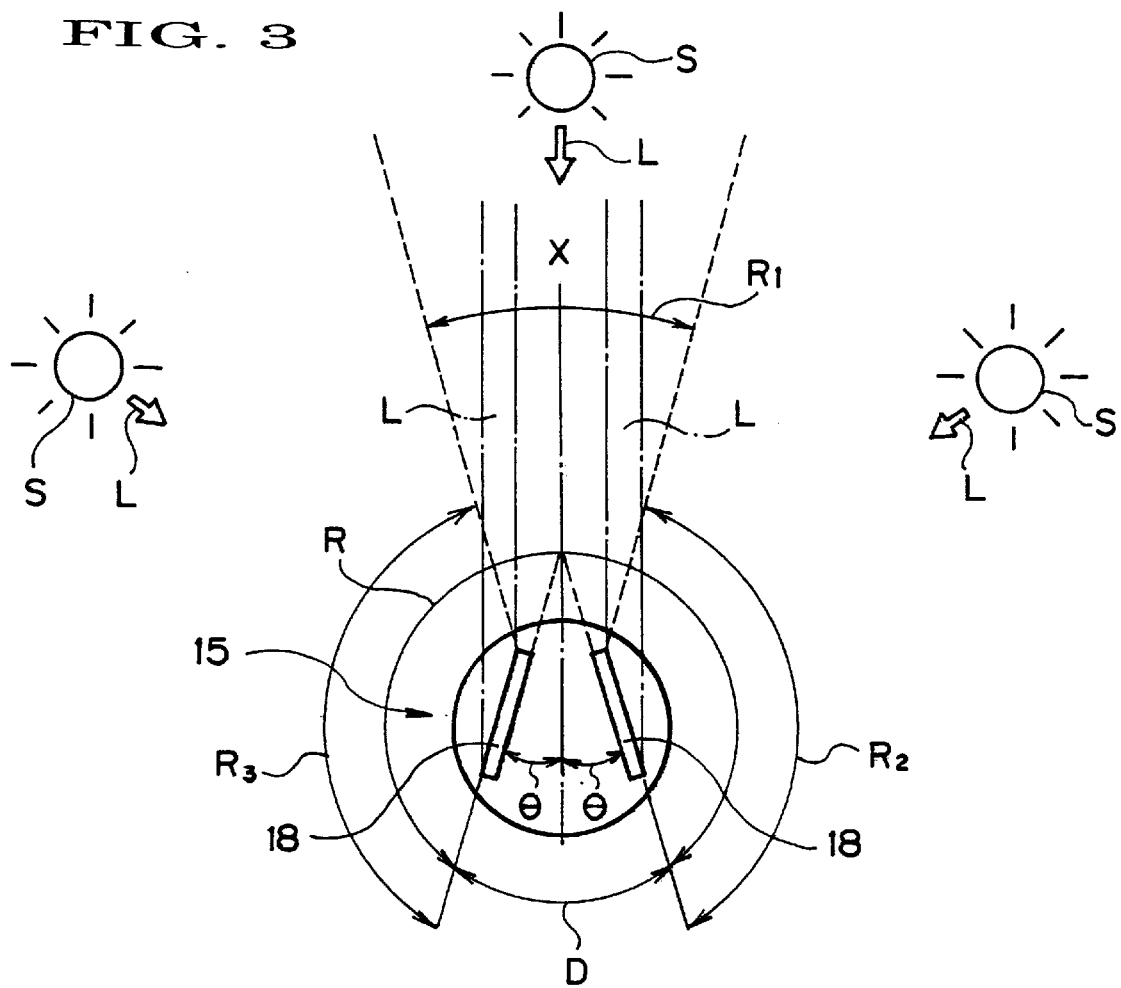
FIG. 3 is a schematic diagram of light-receiving angles of optical sensors.
Figure 4:
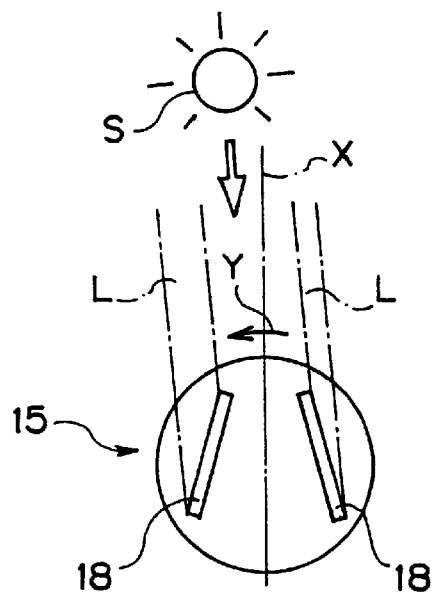
FIG. 4 is a schematic diagram of a state in which sunlight radiates from a direction off the central axis between a pair of optical sensors.

FIG. 3 shows a state in which light-receiving amounts of the right and left optical sensors 18 are balanced. FIG. 4 shows a state in which the sun S slightly shifts to the left side, in which the light-receiving amount of the left optical sensor 18 is larger. In this case, the azimuth sensor unit 15 as a whole rotates to the left side Y so as to balance the light-receiving amounts. The amount of the rotation to the left side Y of the optical sensors 18 is detected.

The amount of the rotation to the left side Y of the azimuth sensor unit 15 coincides with the amount of the rotation of the sun S itself in diurnal motion. Accordingly, if the concave mirror 10 is rotated at the same angle as that of the azimuth sensor unit 15, light is reflected off the concave mirror 10 in a direction deviating from the direction in which it has been reflected so far. In other words, reflected light is shifted at an angle twice the angle at which the concave mirror 10 is shifted. For this reason, in the heliostat 5, the concave mirror 10 is rotated by half the amounts of rotations of the azimuth sensor unit 15 and the altitude sensor unit 16. As a result, there is no change in the direction of the light reflected off the concave mirror 10, resulting in constant convergence of the sunlight into the first focal point f1 of the oval mirror 1. The azimuth sensor units 15 and the altitude sensor units 16 of the heliostats in large numbers are initially set with different phases so that reflected sunlight L is directed to the first focal point f1.

As described above, the heliostat 5 of this embodiment controls the concave mirror 10 by balancing the light-receiving amounts of the pairs of optical sensors 18 and 20, which is easier than computer controlling, causing few errors. Further, since the optical sensors 18 and 20 are each disposed in the form of the tapered section, the difference of the light-receiving amounts is easy to detect while the position of the sun S shifts, precise controlling being allowed.

Further, as shown in FIG. 1, the sunlight L reflected by the concave mirrors 10 of the heliostats 5 is directed to the first focal point f1 of the oval mirror 1, whereby the sunlight L passing through the first focal point f1 and reflected off the oval mirror 1 is directed to the second focal point f2 positioned below the oval mirror 1. Even though the sunlight L is concentrated into the second focal point f2, the sunlight L has some width. In order to further reduce the width of the sunlight L, the condenser mirror 4 is provided slightly below the second focal point. The condenser mirror 4 has a cylindrical shape in which the upper opening width is larger and the lower opening width is smaller. Accordingly, the sunlight L having some width at the second focal point f2 has a smaller width at the lower opening, a way out of the condenser mirror 4, more efficient light collecting being allowed. The sunlight L emerging from the lower opening of the condenser mirror 4 is sent into the heat-exchange facility 3 where it is converted to thermal energy that is used for generating electric power.

In accordance with this embodiment, the sunlight L reflected off the concave mirrors 10 of the heliostats in large numbers is reflected toward the ground side by the oval mirror 1, so that the heat-exchange facility 3 can be installed on the ground, eliminating the need for building towers to mount a heat exchanger thereon as before.

Further, since a reflective mirror of the heliostat 5 is the concave mirror 10 and the reflected sunlight L is converged, the size D of the oval mirror 1 (See FIG. 1) can be made smaller. Accordingly, the installation of the oval mirror 1 on the supporting towers 2 is facilitated.

Furthermore, the focus of the sunlight L reflected off the concave mirrors 10 of the heliostats 5 is set at the first focal point f1 of the oval mirror 1 thereby to concentrate the sunlight L reflected off the oval mirror 1 into the second focal point f2 of the oval mirror 1, so that a light-concentrating angle Z is smaller, efficient light collecting being permitted.

Furthermore, since the cylindrical condenser mirror 4 is provided in the vicinity of the second focal point f2 of the oval mirror 1 as described above, the sunlight L is further concentrated through the condenser mirror 4, more efficient light collecting being enabled.

What is claimed is:

1. A heliostat for a sunlight collecting system comprising a concave mirror rotating in both an azimuth direction and an altitude direction to constantly reflect and converge sunlight into a fixed light-collecting point, a drive mechanism for rotating the concave mirror in the azimuth direction and the altitude direction and an azimuth sensor unit and an altitude sensor unit each outputting signals related to the amounts of rotations in the azimuth direction and the altitude direction, respectively, to the drive mechanism wherein:

each of the azimuth sensor unit and the altitude sensor unit has a pair of optical sensors disposed along its direction, which pair of optical sensors being disposed toward the sun in the form of a tapered section narrower to the front end and broader to the rear end with their light-receiving surfaces outward, and the azimuth sensor unit and the altitude sensor unit themselves rotate so as to balance light-receiving amounts of their respective pairs of optical sensors and output signals for rotating the concave mirror in the same directions by half the amounts of the rotations of the azimuth sensor unit and the altitude sensor unit to the drive mechanism.

2. A heliostat for a sunlight collecting system as described in claim 1 wherein each optical sensor is disposed at an angle of 5 to 10 degrees with respect to a radiation direction of sunlight.

3. A heliostat for a sunlight collecting system as described in claim 1 wherein the fixed light-collecting point into which the concave mirrors reflect and converge sunlight is a first focal point of an oval mirror.

4. A heliostat for a sunlight collecting system as described in claim 2 wherein the fixed light-collecting point into which the concave mirrors reflect and converge sunlight is a first focal point of an oval mirror.

\* \* \* \* \*